(12) United States Patent
Vide

(10) Patent No.: US 7,324,689 B1
(45) Date of Patent: Jan. 29, 2008

(54) METHOD AND SYSTEM FOR REMOVAL OF RED EYE EFFECTS

(75) Inventor: Adolfo Pinheiro Vide, Donneville (FR)

(73) Assignee: Kwok, Chu & Schindler LLC, Las Vegas, NV (US)

( * ) Notice: Subject to any disclaimer, the term of this patent is extended or adjusted under 35 U.S.C. 154(b) by 128 days.

(21) Appl. No.: 11/175,551

(22) Filed: Jul. 5, 2005

Related U.S. Application Data

(62) Division of application No. 09/767,331, filed on Jan. 22, 2001, now Pat. No. 7,088,855.

(51) Int. Cl.
*G06K 9/00* (2006.01)
*G06K 9/32* (2006.01)

(52) U.S. Cl. ...................................... 382/167

(58) Field of Classification Search ................ 382/115, 382/117, 162, 167, 254, 275, 299; 358/1.13, 358/1.9, 500, 509, 518, 527; 396/155, 158; 348/370, 576
See application file for complete search history.

(56) References Cited

U.S. PATENT DOCUMENTS

| | | | |
|---|---|---|---|
| 4,285,588 A | 8/1981 | Mir | |
| 4,315,024 A | 2/1982 | Abelson | |
| 4,315,204 A | 2/1982 | Sievers et al. | |
| 4,978,989 A | 12/1990 | Nakano et al. | |
| 5,130,789 A | 7/1992 | Dobbs et al. | |
| 5,748,764 A | 5/1998 | Benati et al. | |
| 5,990,901 A | 11/1999 | Lawton et al. | |
| 5,990,973 A | 11/1999 | Sakamoto | |
| 6,009,209 A | 12/1999 | Acker et al. | |
| 6,016,354 A | 1/2000 | Lin et al. | |
| 6,285,410 B1 | 9/2001 | Marni | |
| 6,631,208 B1* | 10/2003 | Kinjo et al. | 382/167 |
| 6,690,822 B1 | 2/2004 | Chen et al. | |
| 6,701,007 B1* | 3/2004 | Yamaguchi | 382/162 |
| 6,718,051 B1 | 4/2004 | Eschbach | |
| 6,728,401 B1 | 4/2004 | Hardeberg | |
| 6,788,425 B1* | 9/2004 | Ohtsuka et al. | 358/1.13 |
| 6,798,903 B2* | 9/2004 | Takaoka | 382/167 |
| 7,024,035 B1* | 4/2006 | Enomoto | 382/167 |
| 7,164,496 B2* | 1/2007 | Tatsumi | 358/1.9 |
| 2001/0022853 A1* | 9/2001 | Takaoka | 382/167 |
| 2002/0122588 A1* | 9/2002 | Yamamoto | 382/167 |

* cited by examiner

*Primary Examiner*—Amir Alavi
(74) *Attorney, Agent, or Firm*—Perkins Coie LLP

(57) ABSTRACT

A method of performing red eye correction in an image including storing a high resolution image on a server computer, transmitting a low resolution image derived from the high resolution image, from the server computer to a client computer, displaying the low resolution image on a display device connected to the client computer, receiving from a user an indication of a selected location within the displayed low resolution image, partially automatically defining an outline of an area in the low resolution image within which area red eye correction is to be carried out, by the client computer, based on the user's selected location, carrying out red eye correction on the low resolution image only within the area, by the client computer, and transmitting parameters of the area from the client computer to the server computer. A system is also described and claimed.

20 Claims, 7 Drawing Sheets

METHOD AND SYSTEM FOR REMOVAL OF RED EYE EFFECTS

The application is a divisional of and claims priority to U.S. patent application Ser. No. 09/767,331 filed Jan. 22, 2001 now U.S. Pat. No. 7,088,855.

FIELD OF THE INVENTION

The present invention relates to apparatus and methodologies for red eye removal in photographs.

BACKGROUND OF THE INVENTION

Red Eye removal in photographs is well known in the patent literature. The following U.S. Patents are believed to represent the current state of the art:

| | | | |
|---|---|---|---|
| 4,282,588 | August 1981 | Mir | 296/158 |
| 4,315,024 | February 1982 | Abelson | 514/400 |
| 4,978,989 | December 1990 | Nakano et al | 396/088 |
| 5,130,789 | July 1992 | Dobbs et al | 358/500 |
| 5,748,764 | May 1998 | Banati at al | 382/117 |
| 5,990,901 | November 1999 | Lawton et al | 345/429 |
| 5,990,973 | November 1999 | Sakamoto | 348/576 |
| 6,009,209 | December 1999 | Acker et al | 382/275 |
| 6,016,354 | January 2000 | Lin et al | 382/117 |

When photographs are taken of people using a digital or traditional film camera with a flash, a common artifact that can appear in the picture is referred to as "red eye." This artifact manifests itself as a red coloration within the iris of an eye, instead of the natural eye color, and is referred to as a "flash effect."

Red eye is caused by the reflection of light from a flash off of the blood vessels of the retinas of a subject's eyes. The size of the area affected by red eye increases with increased dilation of the eye.

One can try to reduce the red eye effect by increasing the light level in a room. Alternatively, one can have a subject look at a bright light, such as a room lamp, just before taking the flash picture. Both methods of red eye reduction described above cause the pupils of the subject's eyes to contract, thereby reducing the amount of reflective surface.

Reference is made to FIG. 1, which is a simplified line drawing showing a typical red eye artifact in a photograph. An area 110 corresponding to the iris of an eye, of blue coloration, encompasses a pupil area 120 that exhibits redness. Within area 120 there is seen a small white flash area 130, which represents reflections of white light from the flash. Were it not for the red eye artifact, area 120 would appear similar in color to area 110, being part of the iris. Instead, the artifact gives it a red appearance.

Interestingly, this flash effect appears as red eye in humans, but as yellow eye in dogs and cats, and as green eye in some other animals. Photographers and image compositors commonly touch up their images and remove red eye flash effects from eyes.

Adobe Systems Inc.'s PHOTODELUXE® and Microsoft Corporation's PICTURE IT!® are digital photo-editing software applications that offer semi-automatic red eye removal as a feature.

SUMMARY OF THE INVENTION

The present invention seeks to provide apparatus and a methodology for red eye removal in photographs, which is particularly suitable for Internet applications but may also be used for other photographic applications.

There is thus provided in accordance with a preferred embodiment of the present invention a method of performing red eye correction in an image including partially automatically defining an outline of an area in an image within which area red eye correction is to be carried out, and carrying out red eye correction only within the area.

There is further provided in accordance with a preferred embodiment of the present invention a system of performing red eye correction in an image including a red eye area processor partially automatically defining an outline of an area in an image within which area red eye correction is to be carried out, and a red eye correction processor carrying out red eye correction only within the area.

There is yet further provided in accordance with a preferred embodiment of the present invention a method of performing red eye correction in an image including storing a high resolution image on a server computer, transmitting a low resolution image derived from the high resolution image, from the server computer to a client computer, displaying the low resolution image on a display device connected to the client computer, receiving from a user an indication of a selected location within the displayed low resolution image, partially automatically defining an outline of an area in the low resolution image within which area red eye correction is to be carried out, by the client computer, based on the user's selected location, carrying out red eye correction on the low resolution image only within the area, by the client computer, and transmitting parameters of the area from the client computer to the server computer.

There is additionally provided in accordance with a preferred embodiment of the present invention a method of performing red eye correction in an image including displaying an image on a display device, receiving from a user an indication of a selected location within the displayed image, partially automatically defining an outline of an area in the image within which area red eye correction is to be carried out, by the client computer, based on the user's selected location, carrying out red eye correction on the image only within the area, and transmitting parameters of the area to a server computer.

There is moreover provided in accordance with a preferred embodiment of the present invention a method of performing red eye correction in an image including storing a high resolution image, transmitting a low resolution image derived from the high resolution image, to a client computer, and receiving from the client computer parameters of an area in the low resolution image within which area red eye correction is to be carried out.

There is further provided in accordance with a preferred embodiment of the present invention a system for performing red eye correction in an image including a server memory storing a high resolution image on a server computer, a server transmitter transmitting a low resolution image derived from the high resolution image, from the server computer to a client computer, a client display device connected to the client computer displaying the low resolution image, a client user interface on the client computer receiving from a user an indication of a selected location within the displayed low resolution image, a client red eye area processor partially automatically defining an outline of an area in the low resolution image within which area red eye correction is to be carried out, by the client computer, based on the user's selected location, a client red eye correction processor carrying out red eye correction on the low resolution image only within the area, by the client computer, and a client transmitter transmitting parameters of the area from the client computer to the server computer.

There is yet further provided in accordance with a preferred embodiment of the present invention a system for performing red eye correction in an image including a display device displaying an image, a receiver receiving from a user an indication of a selected location within the displayed image, a red eye area processor partially automatically defining an outline of an area in the image within which area red eye correction is to be carried out based on the user's selected location, a red eye correction processor carrying out red eye correction on the image only within the area, and a transmitter transmitting parameters of the area to a server computer.

There is additionally provided in accordance with a preferred embodiment of the present invention a system for performing red eye correction in an image including a memory storing a high resolution image, a transmitter transmitting a low resolution image derived from the high resolution image, to a client computer, a receiver receiving from the client computer parameters of an area in the low resolution image within which area red eye correction is to be carried out, and a red eye correction processor performing red eye correction on the high resolution image, using the parameters of the area received from the client computer.

BRIEF DESCRIPTION OF THE DRAWINGS

The present invention will be understood and appreciated more fully from the following detailed description, taken in conjunction with the drawings in which.

LIST OF APPENDICES

Appendix A is a listing of a software function for performing red eye correction in accordance with a preferred embodiment of the present invention.

DETAILED DESCRIPTION OF A PREFERRED EMBODIMENT

The present invention provides a method and system for correction of red eye artifacts within digital images.

Correction of red eye artifacts involves two primary stages: (i) identification of an area of pixel locations within a digital image that are affected by red eye artifacts, and (ii) correction of pixel color values within the identified area.

Digital images are generally characterized by a two-dimensional array of picture elements, or "pixels." Each pixel corresponds to a location (x, y), where x and y are non-negative integers, and includes a color value. A color value is typically a triple (R, G, B), where R, G and B are each 8-bit integers; i.e., non-negative integers taking values between 0 and 255. R, G and B represent three primary additive color components, with R indicating an amount of red, G indicating an amount of green, and B indicating an amount of blue. (R=0, G=0, B=0) corresponds to black, and (R=255, G=255, B=255) corresponds to white. Thus a digital image includes a two-dimensional array ($R_{xy}$, $G_{xy}$, $B_{xy}$; 0<=x, y<=255) of three-dimensional color vectors.

In a preferred embodiment, the present invention operates by displaying a digital image and receiving an input from a user to identify a general position within the digital image wherein pixels affected by red eye are present. Specifically, the user clicks on a pixel location, denoted hereinbelow (Ix, Iy), within the image where there is redness in an eye.

Figure 2:
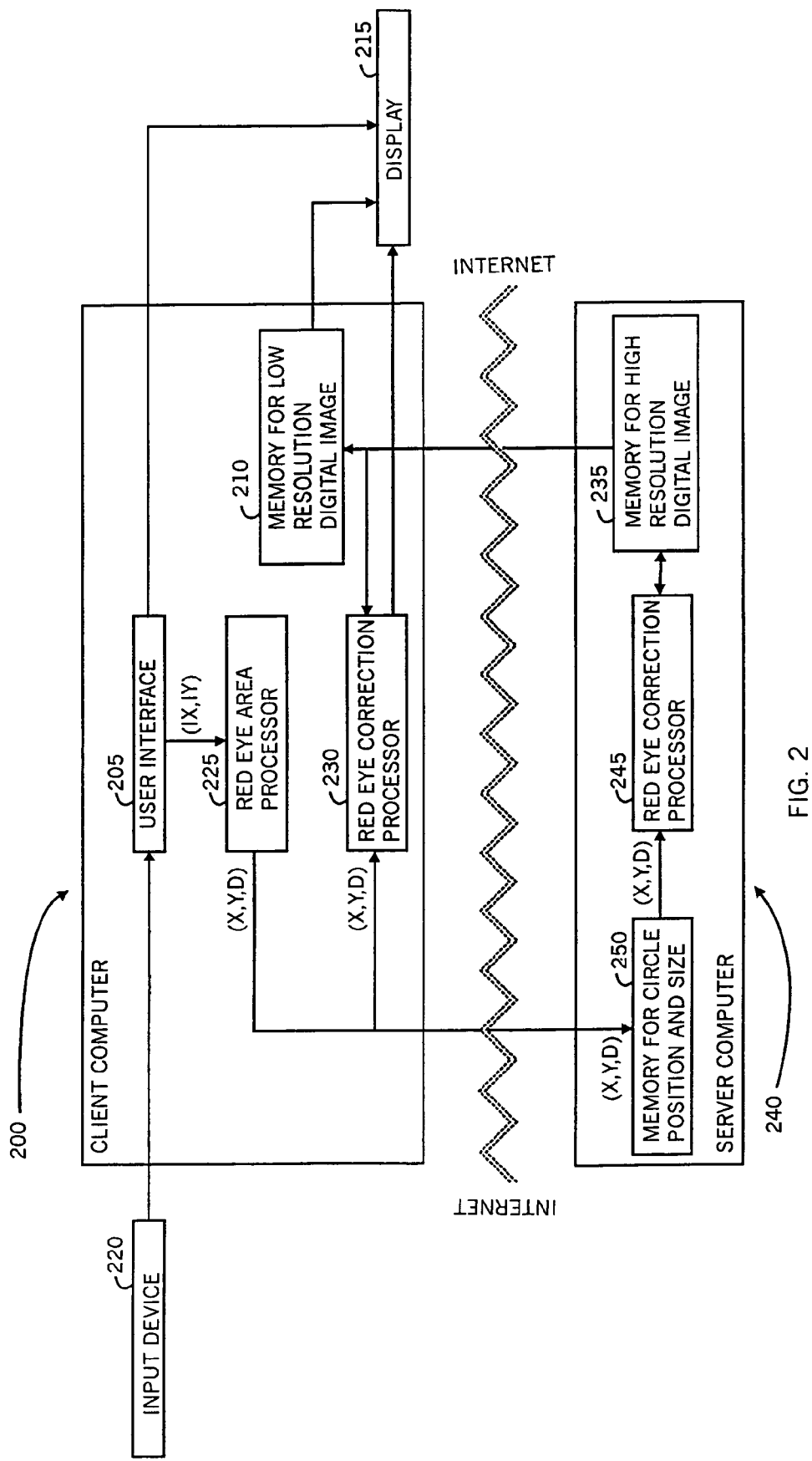
FIG. 2 is a simplified system diagram for a red eye removal system operating over the Internet, in accordance with a preferred embodiment of the present invention.

Reference is now made to FIG. 2, which is a simplified system diagram for a red eye removal system operating over the Internet, in accordance with a preferred embodiment of the present invention. Client computer 200 includes a user interface 205, which a user employs to view a digital image, stored in a client memory 210 and displayed on display device 215, and to select a pixel location (IX, IY) within the digital image by means of input device 220. Input device 220 can be a mouse or a keyboard or another suitable device capable of selecting a point within a displayed image.

User interface 205 transmits the coordinates (IX, IY) to red eye area processor 225. Red eye area processor 225 calculates the position and size parameters (X, Y, D) of a circle, such as circle 350 (FIG. 3), that tightly covers the pixels of the digital image that are affected by red eye, in the vicinity of the user selected location (IX, IY), as described in detail hereinbelow with reference to FIGS. 3-6 and Appendix A. Circle position and size parameters include the pixel location, (X, Y), of the center of the circle and its diameter, D, in pixel units. For purposes of clarity and ease of description, a circle is identified hereinbelow-through parameters (X, Y, D), where (X, Y) denotes the pixel location of the center of the circle, and D denotes the size of its diameter in pixel units.

A red eye correction processor 230 corrects red eye pixels of the digital image that reside within the circle having the position and size parameters (X, Y, D), as described hereinbelow with reference to Appendix A.

The digital image stored in memory 210 is preferably a low resolution version of a high resolution digital image that is stored in a memory 235 on a server computer 240. The low resolution digital image is transmitted from server computer 240 to client computer 200 for storage in memory 210, and is suitable for display on display device 215. The low resolution digital image may be pre-stored on server computer 240, or may be dynamically computed from the high resolution digital image on the fly. Transmission of low resolution image data is ideal for Internet applications, since bandwidth is constrained.

Server computer 240 also contains a red eye correction processor 245, which can be used to perform on server computer 240 the red eye correction performed by client computer 200. Preferably, after a user performs red eye correction to the low resolution digital image on client computer 200, the results may be saved on server computer 240 for subsequent access. The client computer need not save the low resolution digital image or the circle position and size parameters (X, Y, D).

A unique feature of the present invention is the ability to apply red eye correction across multiple resolutions of the same digital image. Thus, although circle position and size parameters (X, Y, D) are computed by red eye area processor 225 based on pixel data from the low resolution image, the same circle can be scaled to a higher resolution and used to apply red eye correction to the high resolution image. Specifically, client computer 200 transmits the computed circle position and size parameters (X, Y, D) to server computer 240 over the Internet, for storage in a circle position and size parameter memory 250, and red eye correction processor 245 applies red eye correction to the high resolution digital image within a scaled version of the computed circle.

In a preferred embodiment of the present invention, circle position and size parameters (X, Y, D) are expressed in resolution-independent form, thus obviating the need to rescale the circle on server computer 240. Resolution-independent parameters are generally floating point numbers, typically based on a scale in which the image dimensions are 1.0×1.0. Thus it may be appreciated that resolution-independent parameters are effectively percentages of image width and image height. Alternatively, resolution-independent parameters can be based on a scale in which the smaller dimension of the image is 1.0 and the larger dimension is determined based on the image aspect ratio; or vice versa, based on a scale in which the larger dimension of the image is 1.0 and the smaller dimension is determined based on the image aspect ratio.

It may be appreciated that the present invention enables server computer 240 to provide users with web based image editing services. Client computer accesses digital images residing on server computer 240, applies red eye correction to the images, and saves the results on server computer 240. Red eye corrections are then automatically applied whenever the user subsequently accesses the digital images. Bandwidth usage is minimized, since server computer only transmits low resolution image data to client computer 200, and client computer 200 only transmits the circle position and size parameters to server computer 240.

Identifying Red Eye Pixels

The present invention preferably operates by finding a circular area of pixel locations that tightly covers the pixels of the eye affected by red eye. As a preliminary matter, it is necessary to identify, typically in terms of (R, G, B) color values, pixels whose colors are affected by red eye. The present invention preferably uses the criteria $$2R > 3G + 12, \quad R > B + 12 \qquad (1)$$

to identify pixels affected by red eye ("red eye pixels"). Thus, for example, a pixel with color values (R=100, G=50, B=50) has sufficient red to be identified as a red eye pixel, whereas a pixel with color values (R=75, G=50, B=50) does not.

Although red eye pixels are described above according to the conditions in Equation 1, it may be appreciated by those skilled in the art that other conditions on R, G and B may be used to determine whether the color values R, G and B correspond to a red eye pixel.

An advantage of Equation 1, as opposed to a simpler criterion such as R>G and R>B, is that it avoids the inclusion of skin tone colors in red eye pixels. Many skin tones have a reddish tint, and their color values (R, G, B) may satisfy R>G and R>B, but fail to satisfy Equation 1. If such colors were to be erroneously identified as red eye pixels, then the red eye pixels could "leak" out of an eye and into the surrounding skin. This would impact the algorithm described hereinbelow with reference to FIG. 3, and cause it to err by adjusting skin tone pixels.

Figure 1:
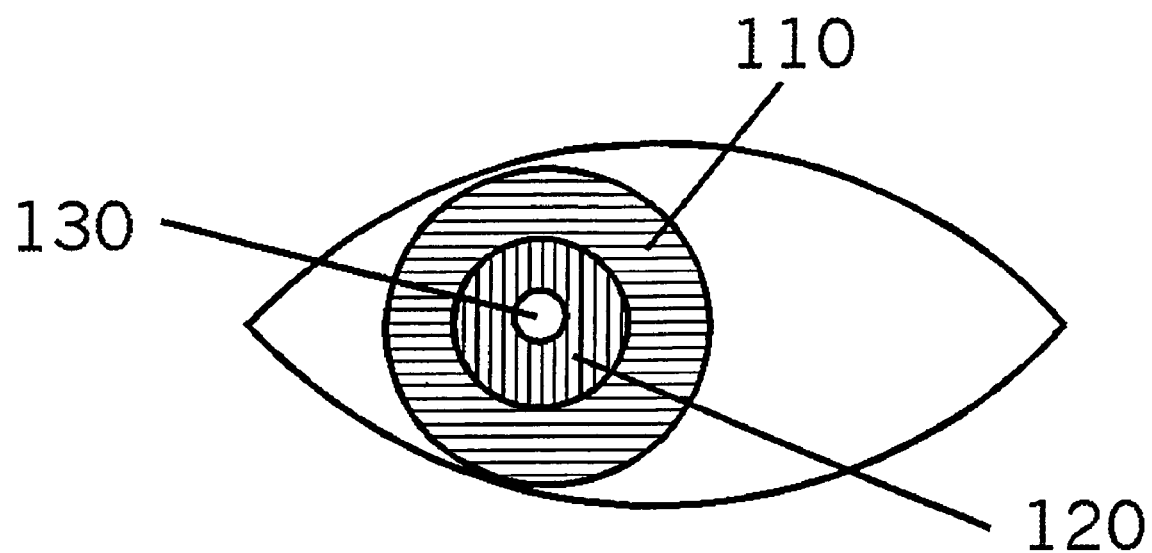
FIG. 1 is a simplified line drawing showing a typical red eye artifact in a photograph.
Figure 3:
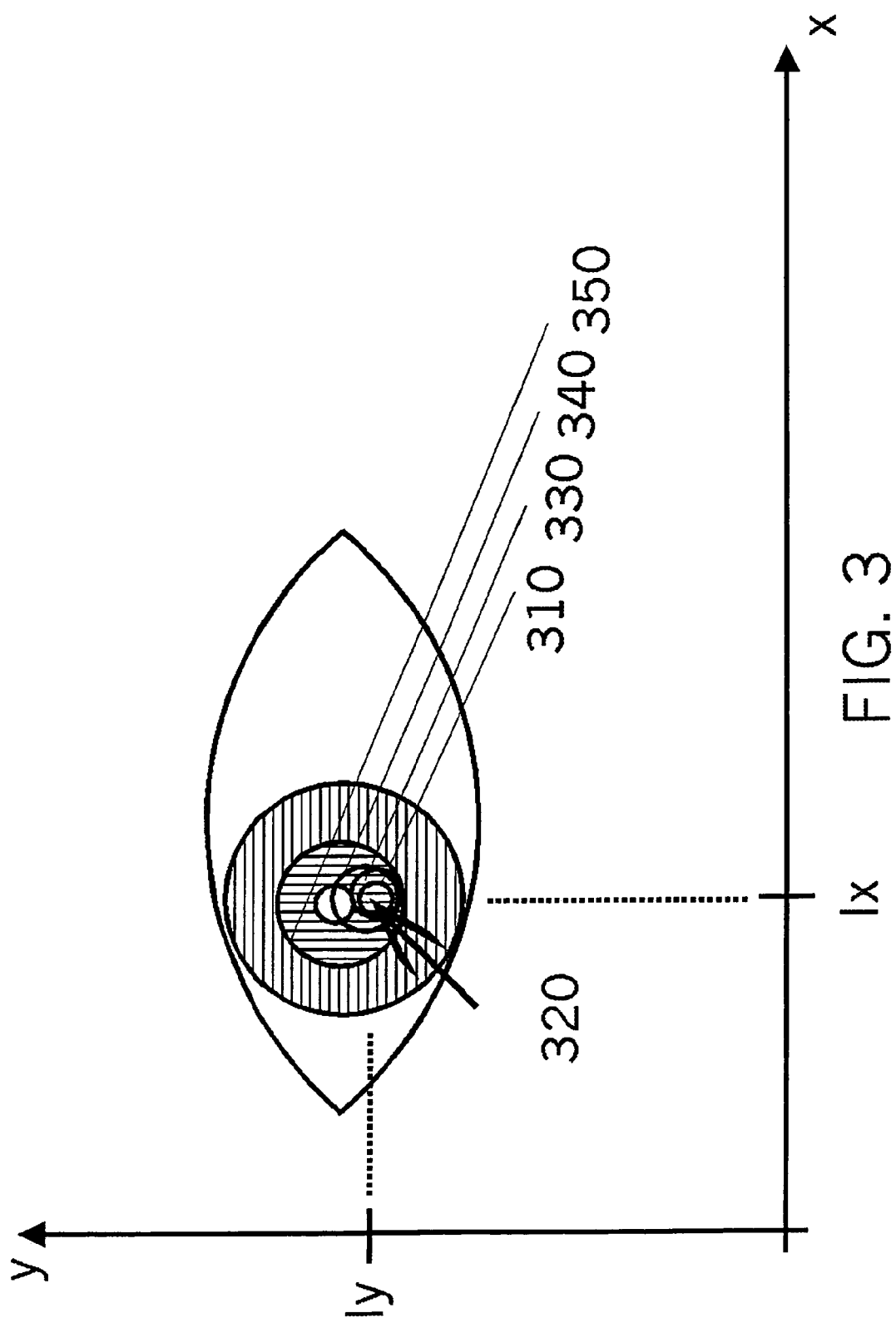
FIG. 3 is a simplified line drawing showing stages in determining the location and size of a red eye removal circle in the photograph of FIG. 1, in accordance with a preferred embodiment of the present invention.

Reference is now made to FIG. 3, which is a simplified line drawing showing stages in determining the location and size of a red eye removal circle in the photograph of FIG. 1, in accordance with a preferred embodiment of the present invention. To find a circular area of pixel locations that tightly covers the red eye pixels, the present invention preferably initializes a circle 310 having a center at pixel location (Ix, Iy), and typically having a diameter of four pixels. Location (Ix, Iy) is the location typically selected by the user using a mouse pointer 320. In a preferred embodiment the circle is automatically iteratively moved and enlarged until it reaches the boundaries of the red eye pixels.

Specifically, in a preferred embodiment of the present invention, circle 310 is automatically adjusted by red eye area processor 225 for repositioning and resizing. Repositioning involves changing the center of circle 310 while keeping its diameter fixed, and resizing involves changing the diameter of circle 210 while keeping its center fixed. Preferably, circle 310 is repositioned before being resized. Circle 310 is moved in the four directions North, South, East and West. Typically, the direction that produces the circle with the most red eye pixels on its periphery is selected for repositioning circle 310. When the circle is positioned such that no single proposed movement improves the number of red eye pixels on its periphery, then circle 310 is conditionally resized by increasing its diameter, as described hereinbelow. Typically this eventually results in a larger circle 330.

A condition for increasing the diameter of a circle is based on the percentage of red eye pixels in the periphery thereof. If the percentage falls below a minimum threshold, as described in detail hereinbelow with reference to FIG. 5, then the circle is not further expanded. Preferably, the minimum threshold is set to approximately 70%. Thus, as long as at least 70% of the circumference of the circle contains red eye pixels, the circle continues to expand. It may be appreciated that this criterion enables proper expansion, notwithstanding that the circle overlies the white flash area 130 (FIG. 1), as is the case with circle 330.

Typically in this way, circle 330 eventually expands across white flash area 130 to reach circle 340, and eventually to reach circle 350. Circle 350 is the final circle, since expanding it further produces a circle whose boundary falls within area 120 (FIG. 1), and contains very few red eye pixels.

As will be explained hereinbelow, preferably the minimum threshold is variable.

Figure 4:
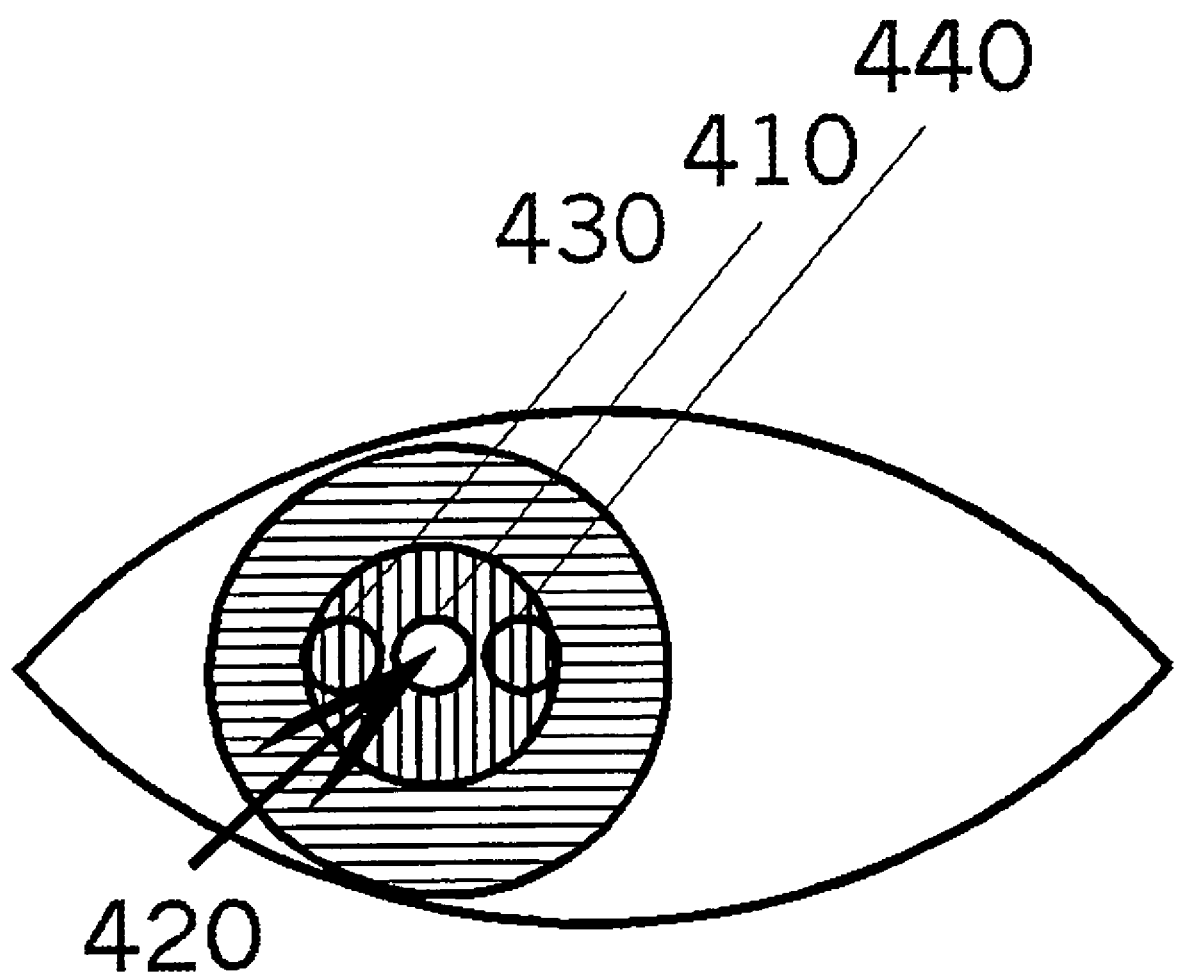
FIG. 4 is a simplified line drawing showing another stage in determining the location and size of a red eye removal circle in the photograph of FIG. 1, in accordance with a preferred embodiment of the present invention.

Reference is now made to FIG. 4, which is a simplified line drawing showing another stage in determining the location and size of a red eye removal circle in the photograph of FIG. 1, in accordance with a preferred embodiment of the present invention. Shown in FIG. 4 is an initial circle 410 that lies within the white flash area 130 (FIG. 1). Such an initial circle can arise when a user positions a mouse pointer 420 within flash area 130, thereby selecting an initial location (Ix, Iy) within area 130. In this case, the algorithm described hereinabove would not enable circle 410 to expand, since nearly all of the pixels on its periphery are white pixels. Should a circle having a size below a given threshold no-longer expand, the present invention preferably initializes additional candidate circles 430 and 440, obtained by moving circle 410 slightly to the left and slightly to the right, respectively. One or more candidate circles whose periphery includes at least a threshold percentage of red eye pixels generally expand to larger circles, using the algorithm described hereinabove, and eventually reach the same circle 350 (FIG. 3).

Figure 5:
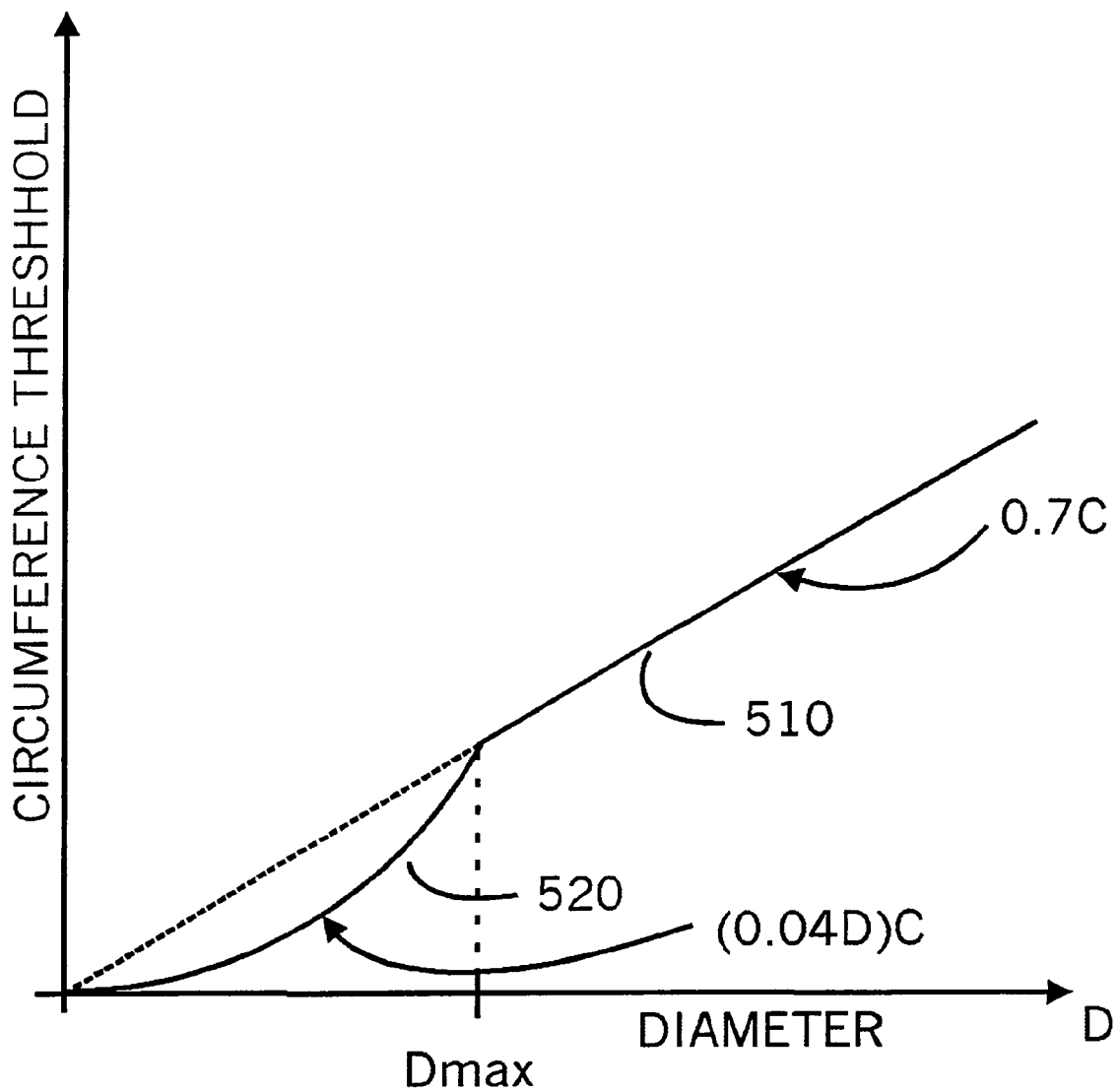
FIG. 5 is a sketch of the dependency of a threshold circumference of a red eye area as a function of diameter, in accordance with a preferred embodiment of the present invention.

Reference is made to FIG. 5, which is a sketch of the dependency of a threshold circumference of a red eye area as a function of diameter, in accordance with a preferred embodiment of the present invention. When initial circle 310 is positioned within the red eye portion of the eye, because of its small size, noise in the image may prevent its circumference from containing sufficient red eye pixels to overcome the minimum threshold percentage of 70%. Some of the red eye pixels in the circumference may not be strictly identified as red according to Equation 1 hereinabove, because of noise in the image or because the image is a low resolution image.

To overcome this, the present invention tapers the minimum threshold percentage so that below a pre-determined diameter, $D_{max}$, the minimum threshold percentage is not a constant, but instead varies proportionally with diameter. Since the circumference itself varies linearly with diameter, D, this induces a quadratically increasing threshold size, for values of D between 0 and $D_{max}$, and a linearly increasing threshold size thereafter, as indicated by respective segments 510 and 520 in the graph of FIG. 5.

Correcting Red Eye Pixels

After a circle, such as circle 350 (FIG. 3) tightly covering the red eye pixels, is determined as above, the present invention preferably corrects the red eye pixels. A pixel with color value (R, G, B) with pixel coordinates (x+u, y+v) within the circle with parameters (x, y, d), for which R>G and R>B, is preferably corrected by modifying R to R', where R' is given by $$R' = \begin{matrix} R - \Delta e^{-2\frac{(u^2+v^2)^2}{r^4}}, & \text{if } \Delta > 0 \\ R, & \text{if } \Delta \leq 0 \end{matrix} \qquad (2)$$

and r=d/2 is the radius of the circle, and where A is given by $$\Delta = R - \frac{5}{4}G. \qquad (3)$$

The variables u and v represent the location of the pixel relative to the center (x, y) of the circle. Thus it may be appreciated that as a pixel moves away from the center, the exponential damping factor decreases from a value of 1 at the center to a value of $e^{-2}$ at the periphery. The exponential factor in Equation 2 serves to provide a gradual spatially varying change in color, and to correct for any inaccuracies in the position and size of circle 350.

Although Equations 2 and 3 have been described as being applied to pixels with color values (R, G, B) satisfying R>G and R>B, it may be appreciated by those skilled in the art that other conditions on R, G and B may be used to determine whether or not the color value (R, G, B) should be modified.

Figure 6:
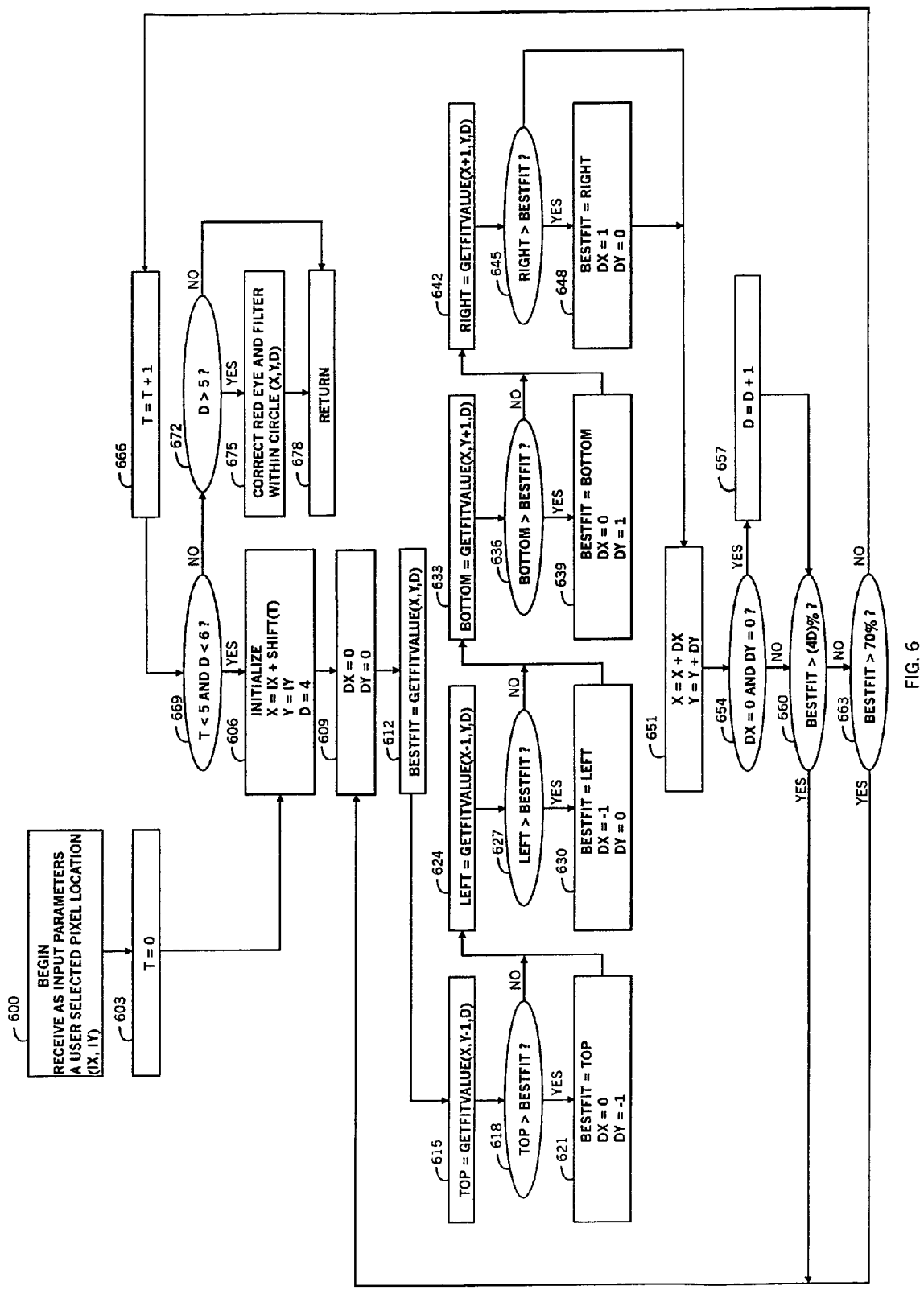
FIG. 6 is a simplified flowchart of an algorithm for determining the location and size of a red eye pixel, in accordance with a preferred embodiment of the present invention.

Reference is now made to FIG. 6, which is a simplified flowchart of an algorithm for determining the location and size of a red eye pixel, in accordance with a preferred embodiment of the present invention. The logic begins at step 600 and the routine receives input parameters IX and IY, for a user selected pixel location. The variables IX and IY refer to the pixel coordinates received from user interface 205 (FIG. 2). At step 603 a counter, T, is initialized to zero. The counter is used as an index to an array SHIFT[T], which stores horizontal shifts used as illustrated in FIG. 4 and described hereinbelow.

At step 606 a loop on T is entered, and variables are initialized as indicated. The term SHIFT[T] in the initialization of X takes values SHIFT[0]=0, SHIFT[1]=2, SHIFT[2]=-2, SHIFT[3]=4, SHIFT[4]=-4. Thus in the first pass through the loop, when T=0, the circle is not shifted. In the second pass through the loop, when T=2, the circle is shifted to the right by two pixel units. In the third pass through the loop, when T=3, the circle is shifted to the left by two pixel units. In the fourth pass through the loop, when T=4, the circle is shifted to the right by four pixel units. In the fifth pass through the loop, when T=4, the circle is shifted to the right by four pixel units.

At step 609 a second loop, nested within the first loop, is entered, and variables DX and DY are initialized to zero. At step 612 the percentage of red eye pixels within the periphery of the circle with parameters (X, Y, D) is calculated and stored in the variable BESTFIT. At steps 615, 618 and 621 a determination is made whether shifting the circle up one pixel unit can increase the percentage of red eye pixels within its periphery. If so, DY is set to -1 and the value of BESTFIT is increased accordingly. Similarly, at steps 624, 627 and 630 a determination is made whether shifting the circle to the left by one pixel unit can increase the percentage of red eye pixels within its periphery. If so, DX is set to -1 and the value of BESTFIT is increased accordingly. Steps 633, 636 and 639 test for a downward shift of the circle, and steps 642, 645 and 648 test for a rightward shift. After completing step 648, the best unit pixel directional movement (DX, DY), from among the four directions North, West, South and East, is known.

At step 651, the values of X and Y are incremented by DX and DY, respectively. At step 654, a determination is made as to whether DX and DY still have their original values DX=0 and DY=0, that were set in step 609. If so, then this indicates that pixel location (X, Y) is a better center point for the circle than any of the four neighboring locations (X, Y-1), (X-1, Y), (X, Y+1) and (X, Y+1). In this case, the diameter, D, is increased by one pixel unit at step 657.

At steps 660 and 663, a determination is made as to whether the percentage of red eye pixels in the periphery of the circle with parameters (X, Y, D) exceeds the minimum of (4D) % and 70%. The 70% threshold corresponds to the upper segment 510 in the graph of FIG. 5, and the (4D) % threshold corresponds to the lower segment 520 in the graph. If BESTFIT exceeds the (4D) % threshold or the 70% threshold, then control returns to step 609 for another iteration within the second loop. Otherwise, the second loop is exited, and control goes to step 666 where the counter T is incremented.

At step 669 a determination is made as to whether T<5 and D<6. The condition D<6 means that the circle did not expand beyond a diameter of five pixel units during the iterations of the second loop. Such is the case, for example, when the initial circle is positioned like circle 310 (FIG. 3) within white flash area 130 (FIG. 1). In this case control goes to step 606 for another iteration within the first loop.

Otherwise, if T>5 or D>5, control goes to step 672 where a determination is made as to whether D>5. If so, the algorithm was able to expand the circle to a diameter of at least six pixel units, and the circle with parameters (X, Y, D) is passed to a method that adjusts the red eye pixels within the circle according to Equations 2 and 3 hereinabove.

If step 672 determines that D>5, then the algorithm has failed to produce a suitable circle, and control exits at step 678, without correcting the red eye pixels.

Figure 7:
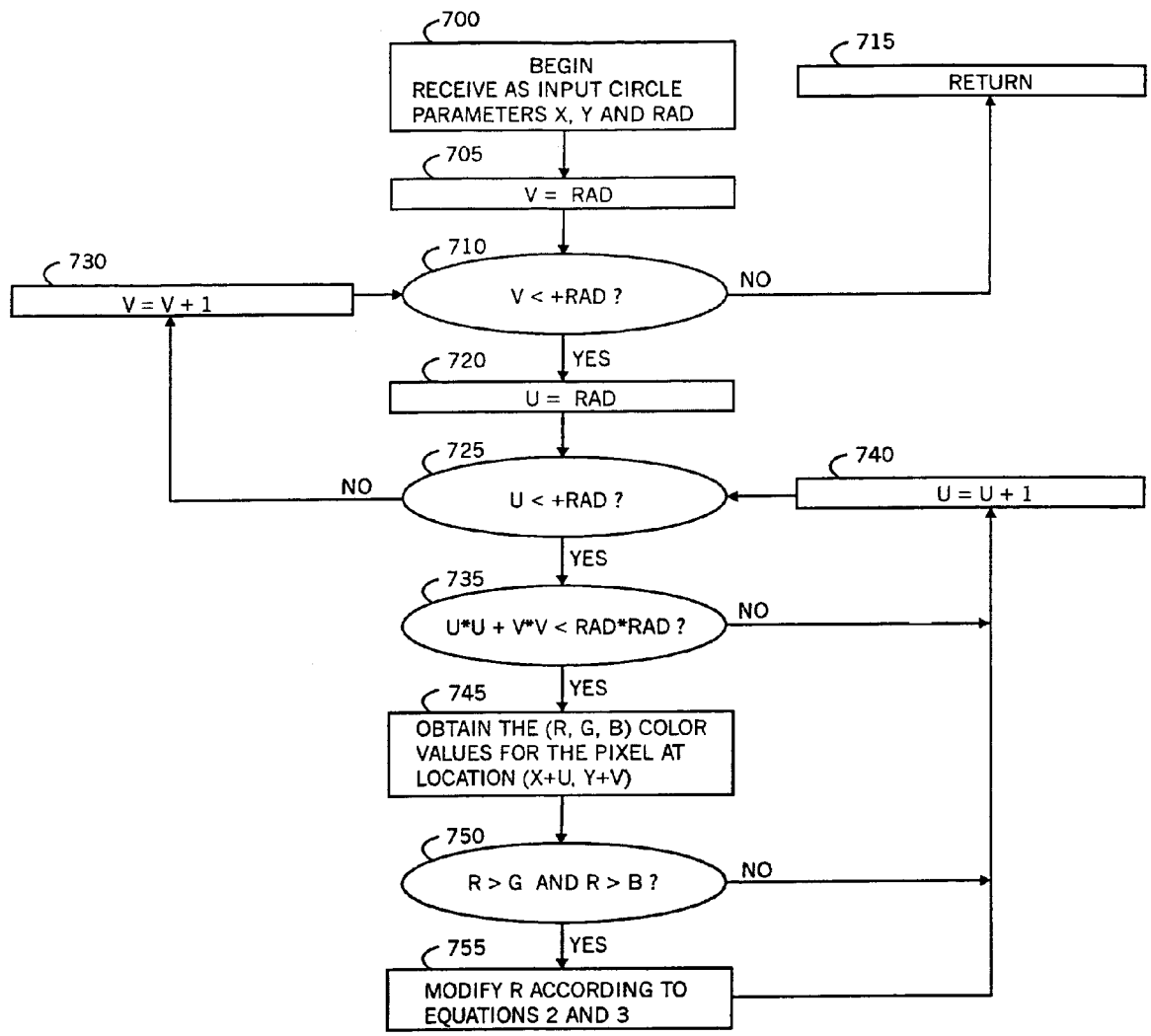
FIG. 7 is a simplified flowchart of an algorithm for correcting red eye, in accordance with a preferred embodiment of the present invention.

Reference is now made to FIG. 7, which is a simplified flowchart of an algorithm for correcting red eye, in accordance with a preferred embodiment of the present invention. The logic begins at step 700 and the routine receives input parameters X, Y and RAD, for a circle with center (X, Y) and radius RAD. At step 705 the variable V is initialized to −RAD. The variable V represents the vertical offset from the center (X, Y) of the circle, in pixel units. At step 710 an outer loop on V is entered and a determination is made as to whether V<RAD. If not, then control terminates at step 715. Otherwise, at step 720 the variable U is initialized to −RAD. The variable U represents the horizontal offset from the center (X, Y) of the circle, in pixel units. At step 725 an inner loop on U is entered and a determination is made as to whether U<RAD. If not, then control goes to step 730 where the variable V is incremented by one, and another iteration of the outer loop is entered. Otherwise, control proceeds to step 735. Together, the inner and outer loops range over the pixel locations within a square of side 2*RAD circumscribed about the circle with center (X, Y) and radius RAD.

At step 735 a determination is made as to whether location (X+U, Y+V) is within the circle with center (X, Y) and radius RAD. If not, control goes to step 740 where the variable U is incremented by one, and another iteration of the inner loop is entered. Otherwise, control proceeds to step 745 where the R, G and B color values for the pixel at location (X+U, Y+V) are obtained. At step 750 a determination is made as to whether these color values correspond to a reddish color. Specifically, a determination is made as to whether R>G and R>B. It may be appreciated by those skilled in the art that other conditions on R, G and B may be used to determine whether the color values R, G and B correspond to a reddish color. If not, control goes to step 740 as above. Otherwise, the red color component, R, is modified according to Equations 2 and 3 hereinabove. Finally, control proceeds to step 740 as above.

The present invention has several advantages, including:

The user's original image is not modified.

The user input is only a single click at a location within a red eye area. The data storage requirements are minimal, making it ideal for performing red eye removal over a server client computing architecture as illustrated in FIG. 2, since only a small amount of data needs to be transmitted over the Internet.

Implementation Details

Reference is now made to Appendix A, which is a software listing of methods used to determine a circle 350 (FIG. 3) that tightly covers the red eye pixels within an eye.

The method getFitValue( ) computes the percentage of red eye pixels within the circumference of a circle centered at location (iX, iY) and having a diameter D. The circumference is generated as a thin annulus situated between two concentric circles centered at location (iX, iY), of radii D/2 and (D-3)/2. The double loop on j and i accumulates the number of red eye pixels and the total number of pixels within the annulus. The variable nbTotal accumulates the total number of pixels located within the annulus. The variable nbRedEye accumulates the number of red eye pixels located within the annulus, based on the criterion of Equation 1. The method returns the ratio (nbRedEye*1000)/nbTotal, which is ten times the percentage of red eye pixels within the annulus.

The method computeRedEye( ) determines the position (x, y) of the center of circle 350 and the size of its diameter, d. This method corresponds to the flowchart illustrated in FIG. 6. It begins with an initial circle 310 centered at location (x=iX, y=iY), which is generally the location indicated by a user through an input device, such as a mouse or keyboard, and having an initial diameter d=4. The method repositions and resizes circle 310 iteratively, according to the algorithm described hereinabove, until the circle adjusts to a final circle 350.

The inner do loop of computeRedEye( ) shifts the current circle, having center (x, y) and diameter d, one pixel unit in each of the four directions North, West, South and East, and determines which circle yields the highest percentage of red eye pixels in its circumference, based on the value of getFitValue( ) for the circle. If at least one of the shifted circles has a higher percentage of red eye pixels in its circumference that the unshifted circle, the center (x, y) is shifted by one unit in the direction that corresponds to the highest such percentage. Otherwise, if none of the shifted circles has a higher percentage of red eye pixels in its circumference that the unshifted circle, then the diameter, d, is incremented by one unit. The do loop continues as long as the percentage of red eye pixels in the circumference of the current circle, having center (x, y) and diameter d, is at least 4 times the diameter, or 70%, whichever is smaller.

The loop surrounding the abovementioned do loop re-computes the above described positioning and sizing adjustments for an initial circle shifted horizontally from the user selected location (iX, iY) by pixel amounts+2, −2, +4 and −4. These re-computations are only performed if the current circle has not grown to a diameter of at least 6 pixels. Since the initial diameter is 4, the occurrence of this condition means that the previous initial circle was essentially unable to expand. Such is the case, for example, when the initial circle is situated within white flash area 130 (FIG. 1), as illustrated in FIG. 4 with respect to initial circle 410.

Finally, after determining a circle that tightly covers the red eye pixels within the eye, the method ComputeRedEye( ) calls CreateFilter( ) to adjust the red eye pixel color values according to Equations 2 and 3 hereinabove.

The method RemoveRedEye( ) applies red eye correction according to Equations 2 and 3 above, for pixels situated within a circle and having color values (red, green, blue) for which red>green and red>blue. It accepts as input parameters a location (x, y) for the center of a circle, and a radius, r. The variables reX, reY and reR are re-scaled versions of x, y and r, respectively, scaled to accommodate a change in image dimensions from a source image to a destination image.

The two nested for loops run through all pixels in a square of dimensions 2 reR×2 reR circumscribing the circle. The outer loop steps a variable dy from −2 reR to +2 reR, and the inner loop steps a variable dx from −2 reR to +2 reR. The variables dx and dy represent the relative offset of a pixel location from the center (reX, reY). For pixels situated within the circle with center (reX, reY) and radius reR, and for which the color values (red, green, blue) satisfy red>green and red>blue, the red color value is adjusted according to Equations 2 and 3 above.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

APPENDIX A

```
private int getFitValue(int iX, int iY, int iD)
{
    int nbTotal = 0; // total number of pixels in the circle
    int nbRedEye = 0; // number of pixels in the redness criterion
    int valMax = iD*iD; // values over sqrt(valMax) are outside
    int valMin = (iD-3)*(iD-3); // values under sqrt(valMin) are outside
    int dy = -iD/2;
    for (int j=0;j<iD;++j) {
        int dx = -iD/2;
        int dy2 = dy*dy;
        int idx = mMap.getOffset(iX+dx,iY+dy);
        for (int i=0;i<iD;++i) {
            int val = 4*(dx*dx+dy2);
            // if in circumference
            if (val <= valMax && val >= valMin) {
                int r = (int) (rMap[idx] & 0xFF);
                int g = (int) (gMap[idx] & 0xFF);
                int b = (int) (bMap[idx] & 0xFF);
                // if there is redness
                if(2*r>3*g+12 && r>b+12)
                    ++nbRedEye;
                ++nbTotal;
            }
            ++idx;
            ++dx;
        }
        ++dy;
    }
    // returns the 10 x percentage value of fitness
    return (nbRedEye*1000)/nbTotal;
}
private void computeRedEye(int iX, int iY)
{
    // get the best circle covering the redness of the eye
    int dx;
    int dy;
    int d = 4;
    int center;
    int y = iY;
    int x = iX;
    int tx[ ] = {0, 2, -2, 4, -4};
    // loop to simulate user clicks at iX, iX + 2, iX - 2, iX + 4, iX - 4
    for (int t=0; t < 5 && d<6;++t) {
        x = iX + tx[t];
        d = 4; // minimal diameter
        do {
            dx = dy = 0;
            // center value
            center = getFitValue(x,y,d);
                // north value
            int top = getFitValue(x,y-1,d);
            if (top > center) {
                center = top;
                dx = 0;
                dy = -1;
            }
            // West value
            int left = getFitValue(x-1,y,d);
            if (left > center) {
                center = left;
                dx = -1;
                dy = 0;
            }
            // South value
            int bottom = getFitValue(x,y+1,d);
            if (bottom > center) {
```

APPENDIX A-continued

```
                center = bottom;
                dx = 0;
                dy = 1;
            }
            // East value
            int right = getFitValue(x+1,y,d);
            if (right > center) {
                center = right;
                dx = 1;
                dy = 0;
            }
            // Moves the circle to the best fitness value
            x += dx;
            y += dy;
            // If the circle does not move increase its size
            if (dx==0 && dy==0)
                ++d;
            // while the criteria is true and we not go too far
        } while ((center >= 40*d || center >= 700) && (d < 128));
    }
    // if the circle has increased we found redness
    if (d > 5) {
        CreateFilter(x,y,d);
    }
}
// x,y: center of the redeye circle in the image source coordinates.
// r: radius of the redeye circle in the image source scale
// img: the destination image to be filtered
// t: an affine matrix of the form
// +- -+
// |a b tx |
// |c d ty |
// +- -+
//
// converting image source coordinates into image destination coordinates
//
public void RemoveRedEye(Image img, Matrix t, int x, int y, int r)
{
    // converts redeye sources coordinates to destination image
    int reX = (int)(t.a*x + t.b*y + t.tx + 0.5);
    int reY = (int)(t.c*x + t.d*y + t.ty + 0.5);
    int reR = (int)(r * t.getScale( ) + 0.5);
    // If at least one pixel
    if (reR > 0) {
        long R2 = reR*reR;
        double R4 = R2*R2;
        int dx;
        int dy = -reR;
        // For each line
        for (int l=0; l<2*reR; ++l,++dy) {
            long dy2 = dy*dy;
            dx = -reR;
            // For each pixel on each line
            for (int c=0;c<2*reR;++c,++dx) {
                long r2 = dx*dx+dy2;
                //if inside the remove red eye disc
                if(r2 <= R2) {
                    int r = img[reX+dx][reY+dy].Red( );
                    int g = img[reX+dx][reY+dy].Green( );
                    int b = img[reX+dx][reY+dy].Blue( );
                    // If there is redness
                    if (r > g && r > b) {
                        int deltaGR = r - (g * 5) / 4;
                        // if red > 80% green
                        // removes extra redness modulated by
                        // distance to the center
                        if (deltaGR > 0)
                            img[reX+dx][reY+dy].ChangeRed(r -
 deltaGR*Math.exp(-(2*r2*r2)/R4));
                    }
                }
            }
        }
    }
}
```

What is claimed is:

1. A method of performing red eye correction in an image comprising:
   storing a high resolution image on a device including memory;
   transmitting a low resolution image derived from the high resolution image, from the device to a client computer; and
   receiving at the device, from the client computer, parameters of an area in the low resolution image within which area red eye correction is to be carried out.

2. A method of performing red eye correction according to claim 1 further comprising carrying out red eye correction on the high resolution image, using the parameters of the area received from the client computer.

3. A method of performing red eye correction according to claim 2 wherein said carrying out red eye correction comprises modifying red color values of pixels identified as being reddish, based on green color values of such pixels.

4. A method of performing red eye correction according to claim 3 wherein a pixel is identified as being reddish if $$2R > 3G+12, R > B+12$$

where R, G and B comprise the values of red, green and blue color components of the pixel color, respectively, taking values between 0 and 255.

5. A method of performing red eye correction according to claim 3 wherein a pixel is identified as being reddish if $$R > G, R > B$$

where R, G and B comprise the values of red, green and blue components of the pixel color, respectively.

6. A method of performing red eye correction according to claim 3 wherein said modifying modifies a red color value of a pixel identified as being reddish according to $$R' = R - \Delta e^{-2\frac{(u^2+v^2)^2}{A^4}}, \text{ if } \Delta > 0$$
$$R, \text{ if } \Delta \leq 0$$

where R and G comprise pre-corrected values of red and green color components of the pixel, respectively, and where R' comprises the corrected value of the red color component, and where $\Delta$ is given by $$\Delta = R - \frac{5}{4}G.$$

7. A method of performing red eye correction according to claim 1 wherein the area comprises a circle and the parameters of the area include the center and diameter of the circle.

8. A method of performing red eye correction according to claim 1 wherein parameters of the area are expressed in resolution-independent form.

9. A method of performing red eye correction according to claim 1 wherein the device comprises a server computer and the low resolution image is also stored on the server computer.

10. A method of performing red eye correction according to claim 1 wherein the device comprises a server computer and the low resolution image is derived from the high resolution image by the server computer.

11. A system for performing red eye correction in an image comprising:
    a memory for storing a high resolution image;
    a transmitter for transmitting a low resolution image derived from the high resolution image, to a client computer; and
    a receiver for receiving from the client computer parameters of an area in the low resolution image within which area red eye correction is to be carried out.

12. A system for performing red eye correction according to claim 11 further comprising a red eye correction processor for carrying out red eye correction on the high resolution image, using the parameters of the area received from the client computer.

13. A system for performing red eye correction according to claim 12 wherein said red eye correction processor is to modify red color values of pixels identified as being reddish, based on green color values of such pixels.

14. A system for performing red eye correction according to claim 13 wherein a pixel is identified as being reddish if $$R > G, R > B,$$

where R, G and B comprise the values of red, green and blue color components of the pixel color, respectively.

15. A system for performing red eye correction according to claim 12 wherein a pixel is identified as being reddish if $$2R > 3G+12, R > B+12,$$

where R, G and B comprise the values of red, green and blue color components of the pixel color, respectively, taking values between 0 and 255.

16. A system performing red eye correction according to claim 13 wherein said processor is to modify a red color value of a pixel identified as being reddish according to where R and G comprise pre-corrected values of red and green color components of the pixel, respectively, and where R' comprises the corrected value of the red color component, and where $\Delta$ is given by $$R' = R - \Delta e^{-2\frac{(u^2+v^2)^2}{A^4}}, \text{ if } \Delta > 0$$
$$R, \text{ if } \Delta \leq 0$$

17. A system for performing red eye correction according to claim 11 wherein the area is to be a circle and the parameters of the area include the center and diameter of the circle.

18. A system for performing red eye correction according to claim 11 wherein parameters of the area are to be expressed in resolution-independent form.

19. A system for performing red eye correction according to claim 11 wherein the low resolution image is also to be stored in said memory.

20. A system for performing red eye correction according to claim 11 wherein the low resolution image is to be derived from the high resolution image.

* * * * *